United States Patent
Popov et al.

(10) Patent No.: US 11,118,703 B2
(45) Date of Patent: Sep. 14, 2021

(54) FLUID DISTRIBUTION APPARATUS IN PARTICULAR WATER DISTRIBUTION APPARATUS

(71) Applicant: Minebea Mitsumi Inc., Nagano (JP)

(72) Inventors: Vladimir V. Popov, Villingen-Schwenningen (DE); Christian Schmid, Eisenbach (DE)

(73) Assignee: MINEBEA MITSUMI INC., Nagano (JP)

( * ) Notice: Subject to any disclaimer, the term of this patent is extended or adjusted under 35 U.S.C. 154(b) by 117 days.

(21) Appl. No.: 16/530,687

(22) Filed: Aug. 2, 2019

(65) Prior Publication Data
US 2020/0041031 A1    Feb. 6, 2020

(30) Foreign Application Priority Data
Aug. 2, 2018  (DE) .................... 10 2018 118 828.5

(51) Int. Cl.
| | | |
|---|---|---|
| *F16K 31/524* | (2006.01) | |
| *F16K 1/20* | (2006.01) | |
| *F16K 11/22* | (2006.01) | |
| *F16K 11/14* | (2006.01) | |

(52) U.S. Cl.
CPC ...... *F16K 31/52416* (2013.01); *F16K 1/2071* (2013.01); *F16K 11/22* (2013.01)

(58) Field of Classification Search
CPC ..... Y10T 137/86509; Y10T 137/86517; F16K 1/2071; F16K 11/14; F16K 11/16; F16K 11/20; F16K 11/22; F16K 11/163; F16K 11/166; F16K 31/52416; F16K 31/52441

See application file for complete search history.

(56) References Cited

U.S. PATENT DOCUMENTS

| | | | | |
|---|---|---|---|---|
| 1,863,068 | A * | 6/1932 | Pippy .................... | F16K 1/34 251/259 |
| 2,415,466 | A * | 2/1947 | Curtis .................... | F16K 11/166 137/607 |
| 2,539,221 | A * | 1/1951 | Badeaux ............... | F16K 31/524 137/599.11 |
| RE25,155 | E * | 4/1962 | Leuthesser ............. | F16K 11/18 137/597 |
| 3,752,191 | A * | 8/1973 | Botnick .................. | F16K 11/20 137/636.1 |
| 3,894,719 | A * | 7/1975 | Horvath .................. | C02F 1/42 251/231 |

(Continued)

FOREIGN PATENT DOCUMENTS

| | | |
|---|---|---|
| AT | 218808 B | 12/1961 |
| DE | 102016218432 A1 | 3/2018 |
| EP | 2837864 A2 | 2/2015 |

*Primary Examiner* — Seth W. Mackay-Smith
(74) *Attorney, Agent, or Firm* — Steven J. Grossman; Grossman, Tucker, Perreault & Pfleger PLLC (57) ABSTRACT

A fluid distribution apparatus comprising a fluid chamber, at least one fluid inlet, a plurality of fluid outlets and a distribution unit, including a plurality of valve elements for closing the fluid outlets and a camshaft supported to be rotatable about a rotary axis, having a plurality of cams for operating the valve elements. The valve elements are formed as valve flaps and the cams of the camshaft are provide to lift the valve elements off of the fluid outlets as a function of a rotary position of the camshaft.

16 Claims, 4 Drawing Sheets

(56) References Cited

U.S. PATENT DOCUMENTS

| | | | | |
|---|---|---|---|---|
| 3,957,639 | A | * | 5/1976 | Schoen .............. B01D 46/0068 |
| | | | | 210/107 |
| 4,082,115 | A | * | 4/1978 | Gibb ....................... F01D 17/18 |
| | | | | 137/630.2 |
| 4,784,180 | A | * | 11/1988 | Sieberhagen ........... F16K 11/14 |
| | | | | 137/607 |
| 5,113,906 | A | * | 5/1992 | Hogner ................... F16K 7/065 |
| | | | | 137/595 |
| 8,123,196 | B1 | * | 2/2012 | Chernoff ............... F16K 1/2007 |
| | | | | 251/228 |
| 10,351,282 | B2 | * | 7/2019 | Tarumoto ................ F16H 19/04 |
| 2015/0041007 | A1 | * | 2/2015 | Kawasaki ......... F16K 31/52416 |
| | | | | 137/565.11 |
| 2019/0039382 | A1 | * | 2/2019 | Arnold ................... B33Y 40/00 |

* cited by examiner

FLUID DISTRIBUTION APPARATUS IN PARTICULAR WATER DISTRIBUTION APPARATUS

BACKGROUND

The invention relates to a fluid distribution apparatus.

A fluid distribution apparatus is already known from EP 2 837 864 A2. The fluid distribution apparatus comprises a fluid inlet and a plurality of fluid outlets. To close the fluid outlets, the fluid distribution apparatus comprises a plurality of valve elements formed as valve tappets. To open the fluid outlets, the valve elements are linearly operated by means of a camshaft supported in such a way as to be rotatable about a rotary axis. The fluid outlets and the valve elements are arranged along the rotary axis of the camshaft.

It is an object of the invention to provide a generic fluid distribution apparatus, in particular a water distribution apparatus, with advantageous properties with respect to the distribution of at least one fluid, in particular of water, to a plurality of fluid outlets.

SUMMARY

The disclosure is based on a fluid distribution apparatus, in particular a water distribution apparatus, comprising a fluid chamber, at least one fluid inlet, a plurality of fluid outlets and a distribution unit, including a plurality of valve elements for closing the fluid outlets and the camshaft supported to be rotatable about a rotary axis, having a plurality of cams for operating the valve elements.

It is suggested that the valve elements be formed as valve flaps and the cams of the camshaft are provided to lift the valve elements off the fluid outlets as a function of the rotary position of the camshaft. Furthermore, the lifting off of the valve flaps is dependent, in particular, on the geometry of the cams, in addition to the rotary position of the camshaft.

A "fluid distribution apparatus" is to be understood, in particular, as an apparatus provided for distributing a fluid flow to a plurality of consumers and/or for re-directing the fluid flow to at least one of a plurality of consumers. "Provided for" is to be understood as meaning, in particular, specially programmed, configured and/or equipped. An object which is provided for a particular function is to mean, in particular, that the object fulfils and/or carries out this particular function in at least one application and/or operating state. In particular, the fluid distribution apparatus is formed as a water distribution apparatus, which is provided for distributing a water flow to a plurality of consumers and/or for redirecting the water flow to at least one of a plurality of consumers. In particular, the fluid distribution apparatus can be provided for use in a wash water distribution system and/or cooling water system for a motor vehicle.

The fluid distribution apparatus comprises a fluid chamber provided for at least temporarily receiving the fluid to be distributed. In particular, the fluid chamber is flowed through by the fluid to be distributed during operation of the fluid distribution apparatus. Preferably the fluid chamber is permanently at least essentially fully filled by the fluid to be distributed during operation of the fluid distribution apparatus. The fluid chamber can have an essentially rectangular cross-section, in particular. The fluid distribution apparatus also has at least one housing which at least partially forms a sidewall of the fluid chamber. The housing can be formed, in particular, at least essentially in the form of a cuboid and encloses, in particular, a substantially cuboid volume.

The fluid distribution apparatus has at least one fluid inlet, which is provided for introducing the fluid to be distributed into the fluid chamber. Alternatively, the fluid distribution apparatus can also comprise a plurality of fluid inlets. The fluid inlet opens out, in particular, directly into the fluid chamber. The fluid inlet can be arranged on the housing of the fluid distribution apparatus at any position appearing suitable to the person skilled in the art. In particular, the fluid inlet comprises at least one connection neck protruding from the housing, which is provided for connecting a fluid line connected to a fluid source.

Furthermore, the fluid distribution apparatus comprises a plurality of fluid outlets, which are provided for discharging the fluid to be distributed from the fluid chamber. The fluid outlets are arranged, in particular, on a basis of the housing of the fluid distribution apparatus, preferably at a bottom side of the housing. Alternatively, the fluid outlets can be arranged on all housing sides in the circumferential direction of the camshaft. In particular, the fluid outlets have at least one connection neck protruding from the housing, which is provided for connection of a fluid line leading to a consumer. The fluid outlets open out directly into the fluid chamber. The fluid outlets have an at least essentially circular cross-section, in particular, in an opening area toward the fluid chamber. In particular, the openings of the fluid outlets have a circular shape. In the opening area, the fluid outlets are at least essentially flush with an inner sidewall of the fluid chamber. Fluid outlets not used can be closed off, for example, by means of blind stoppers.

Moreover, the fluid distribution apparatus comprises a distribution unit, which is provided for closing or opening the fluid outlets. The distribution unit comprises a plurality of valve elements formed as valve flaps or valve rockers, which are provided for closing off the fluid outlets by blocking and/or closing the openings of the fluid outlets in an essentially fluid-tight, in particular water-tight, manner. The valve elements are preferably arranged entirely within the fluid chamber. Preferably, each fluid outlet has exactly one of the valve elements associated with it. The valve elements are at least partially, and preferably entirely, of a material insensitive to the fluid to be distributed, in particular a stainless steel, a ceramic or a plastic material. Alternatively, the valve elements can also consist of a material combination, for example, of a coated, for example plastic-coated, metal, for example steel. Preferably it is suggested that the number of valve elements correspond to the number of fluid outlets. In particular, the valve elements can be formed as an integral component, for example as a sheet metal part.

The distribution unit comprises a camshaft which is provided for changing the posture and/or alignment of the valve elements formed as valve flaps for changing the fluid distribution. The camshaft is preferably arranged entirely within the fluid chamber. The camshaft is provided, in particular, for changing the posture and/or the alignment of one or more of the respective valve elements at any time while the posture and/or the alignment of the remaining valve elements remains unchanged. The camshaft comprises a plurality of cams, wherein the number of cams corresponds at least to the number of valve elements. Each valve element, in particular, has at least one cam of the camshaft associated with it. The camshaft is supported to be rotatable about a rotary axis, wherein the rotary axis extends at least essentially perpendicular to an outflow direction of the fluid outlets. During a rotary motion of the camshaft, the cams of the camshaft act on the valve elements as a function of a rotary position of the camshaft causing lifting off of the valve elements from the fluid outlets and thus opening of the fluid outlets. A lifting motion of the valve elements caused by the camshaft is directed, in particular, towards the interior of the fluid chamber. In particular, the camshaft can be manually operated and/or preferably servo-driven. Advantageously, the camshaft is formed to be bidirectionally rotatable. Alternatively, the camshaft can also be formed to be only unidirectionally rotatable.

By embodying the disclosure in this manner, a generic fluid distribution apparatus, in particular a water distribution apparatus, can be provided having advantageous operating properties and/or structural features. In particular, an advantageously simple, rugged and/or compact design can be achieved. Furthermore, an advantageously simple and/or reliable distribution of a fluid to a plurality of fluid outlets can be realized.

Furthermore, it is suggested that the cams of the camshaft be provided for causing a rocking and/or pivoting motion of the valve elements. This achieves an advantageously simple and/or reliable changing of a distribution position and/or reliable closing, in particular, of the fluid outlets. In particular, the cams of the camshaft are provided to apply a force to the valve elements during rotation of the camshaft, which causes a rocking and/or pivoting motion of the valve elements. In particular, the force acting on the valve elements is dependent on a rotary position of the camshaft and a resulting position of the cams of the camshaft. The cams of the camshaft can interact, in particular, indirectly or directly with the valve elements.

The cams of the camshaft can be arranged on the circumference of the camshaft in such a manner that with each rotary position of the camshaft one or more of the valve elements are lifted off and thus one or more of the fluid outlets are opened. Preferably, the cams of the camshaft are arranged on the circumference of the camshaft in such a manner that at each rotary position of the camshaft only a maximum of one of the valve elements is lifted off each time and thus only one of the respective fluid outlets is opened. This can advantageously achieve selective opening of individual fluid outlets. In particular, the cams are arranged on the camshaft in a manner offset with respect to each other in the circumferential direction. The cams are arranged on the camshaft, in particular, equidistantly spaced from each other in the circumferential direction. An angular offset between the cams of the camshaft depends, in particular, on a number of the cams and/or a number of fluid outlets.

It is further suggested to arrange the fluid outlets offset with respect to the rotary axis of the camshaft. Preferably, the fluid outlets are arranged along an axial direction of the camshaft offset with respect to the rotary axis of the camshaft. The fluid outlets can be arranged in two rows extending on opposite sides of the camshaft at least essentially parallel to the rotary axis of the camshaft. "Essentially parallel" should be construed to mean, in particular, an alignment in a direction relative to a reference direction, in particular in a plane, wherein the direction with respect to the reference direction has a deviation that is, in particular, smaller than 8°, advantageously smaller than 5° and particularly advantageously smaller than 2°. The fluid outlets of the first rows are preferably arranged along an axial direction of the camshaft offset with respect to the fluid outlets of the second rows. This can achieve an advantageously compact structure, in particular an advantageously short structural length of the fluid distribution apparatus. The valve elements are arranged along the axial direction in the fluid chamber in a manner corresponding to the arrangement of the fluid outlets. Each fluid outlet has one valve element associated with it. A distance between the cams of the camshaft along the axial extension of the camshaft at least essentially corresponds to a spacing of the valve elements as seen along the axial extension of the camshaft.

It is also suggested that the distribution unit comprise a plurality of spring elements which are provided for applying, to each valve element, a spring force acting in a direction towards the fluid outlets. This can advantageously achieve secure closing of the fluid outlets by the valve elements. Preferably, each valve element has one spring element associated with it. The cams of the camshaft are provided for lifting off the valve elements against the spring force. In particular, the cams of the camshaft are provided for indirectly or directly applying, to the valve elements, a force acting against the spring force for opening the fluid outlets.

In one example it is suggested that the valve elements be at least partially formed of a resilient material. Preferably, the valve elements can be made of spring steel. By these means, the spring force acting in the closing direction of the valve element can be advantageously generated by the valve element itself. Furthermore, an advantageously simple and/or reliable design can be achieved. In particular, the valve elements in such an embodiment are at least essentially formed to have a tongue shape. The tongue-shaped valve elements can be stamped and/or cut from a sheet metal, in particular, in an integral manner. The valve elements in this embodiment, in particular, comprise a fixed end which is connected to the housing of the fluid distribution apparatus, in a positionally fixed manner, for example, by means of a screw connection. Also, the valve elements have, opposite the fixed end, positioned on one of the fluid outlets, a free end which is able to be displaced relative to the fixed end in a direction towards the interior of the fluid chamber. A spring force of the valve elements can be adjusted and/or varied, in particular, by choosing a material thickness and/or shape of the valve elements. In the present example, the camshaft is arranged beneath the valve elements, in particular, between the valve elements and the housing of the fluid distribution apparatus, so that the cams of the camshaft elastically deform the valve elements for opening the fluid outlets in a direction towards the interior of the fluid chamber, thus lifting off the tongue-shaped valve elements from the fluid outlet to be opened.

In a further example it is suggested that the valve elements have a closure portion provided for closing the fluid outlets, an operating portion provided for interaction with a cam of the camshaft, and the pivot axis arranged between the closure portion and the operating portion. This helps to achieve an advantageously simple design. The pivot axis of the valve elements extends at least essentially parallel to the rotary axis of the camshaft. The pivot axes of the valve elements are arranged between the camshaft and the fluid outlets. Departing from the pivot axes, the closure portions of the valve elements face in a direction towards the fluid outlets while the operating portions of the valve elements face in a direction towards the camshaft. The operating portions of the valve elements are arranged between the camshaft and the housing of the fluid distribution apparatus. When a fluid outlet is opened, a cam of the camshaft presses the operating portion of the valve element in a direction towards the housing of the fluid distribution apparatus, causing the valve element to perform a pivoting motion about the pivot axis and the closure portion of the valve element to be lifted off the fluid outlet to be opened, in particular against a spring force acting on the closure portion.

It is further suggested that the distribution unit comprise an electric motor, which is provided for rotationally driving the camshaft. This helps to perform an advantageous, in particular automatic, drive of the camshaft. In particular, the electric motor can be formed as a wet stator motor arranged within the fluid chamber. The electric motor is formed, in particular, as an external-rotor motor. Alternatively, the electric motor can also be formed as an internal-rotor motor. The electric motor comprises a stator and a rotor, wherein the camshaft is connected to the rotor of the electric motor in a rotationally fixed manner. The camshaft is connected, in particular, in a frictional and/or interlocking manner, for example by means of a snap connection and/or a screw connection, to the rotor of the electric motor. Alternatively, the camshaft can be an integral part with the rotor of the electric motor. "Integral" should be understood as meaning at least forming a metallurgical or adhesive bond, for example by means of a welding process, an adhesive process or an integral injection-molded process and/or any other process that appears suitable to the person skilled in the art and/or is advantageously formed in an integral manner, such as by manufacturing it as an integrally cast part and/or by manufacturing it in a one or more component injection molding method and advantageously from a single billet or blank. The rotor of the electric motor consists, for example, of plastic-bonded magnets and/or sintered magnets. Furthermore, the distribution unit preferably comprises at least one control electronics for driving the electric motor. The control electronics is preferably arranged outside of the fluid chamber.

It is also suggested that the distribution unit comprise a sensor unit, which is provided for detecting a rotary position of the camshaft. By these means, advantageously, a position of the cams of the camshaft and positions of opened or closed fluid outlets, respectively, can be detected. In particular, the sensor unit can comprise an incremental rotary sensor, an absolute rotary sensor, a potentiometer, a capacitive or even inductive sensor and/or a resolver. In particular, the sensor unit can be provided for detecting and/or determining the rotary position of the camshaft directly and/or via a rotary position of the rotor of the electric motor. In particular, the sensor unit can comprise Hall effect sensors, which are provided for detecting a rotary position of the rotor of the electric motor. To achieve this, the rotor can comprise a magnetization on a side facing the Hall effect sensors, which is detected by the Hall effect sensors and is used by an evaluation electronics for determining the rotary position of the rotor. Alternatively or additionally, the sensor unit can be provided for directly detecting a position of the valve elements, in particular in a capacitive, an inductive manner and/or by means of force sensors. The sensor unit can be at least partially integrated in a control electronics of the electric motor.

Furthermore, it is suggested that the fluid distribution apparatus comprise a plurality of sealing elements, which are arranged at the respective valve elements and/or at the fluid outlets. This helps to achieve an advantageously fluid-tight, in particular, water-tight, closure of the fluid outlets. In particular, each fluid outlet and/or each valve element has at least one sealing element associated with it. In particular, the sealing elements are at least essentially formed by an elastomer. In particular, the sealing elements can be integrally formed with the valve elements.

Furthermore, a fluid distribution system, in particular a wash water distribution system for a motor vehicle, is provided, comprising at least one fluid distribution apparatus according to the invention. By these means, an advantageous distribution of the fluid can be achieved within a fluid distribution system. In particular, the fluid distribution system, in addition to a fluid distribution apparatus, can comprise at least one fluid tank for providing the fluid, at least one fluid pump for pumping the fluid and a plurality of consumers of the fluid. In the case of a wash water distribution system for a motor vehicle, the fluid tank can be, in particular, a water tank for receiving a wash water, the fluid pump can be a water pump and the consumers can be, for example, windscreen washer systems, headlight washer systems and/or sensor cleaning systems.

The fluid distribution apparatus according to the invention should not be construed to be limited to the above-described application and embodiment. In particular, the fluid distribution apparatus according to the invention, to achieve an operation described herein, can comprise a number of individual elements, components and units deviating from the above-mentioned number.

DRAWINGS

Further advantages can be derived from the following description of the drawings. In the drawing, two examples of the invention are shown. The drawing, the description and the claims comprise numerous features in combination. The person skilled in the art will suitably consider the features individually and combine them to create further useful combinations.

In the drawings.

DESCRIPTION OF EXAMPLES

Figure 1:
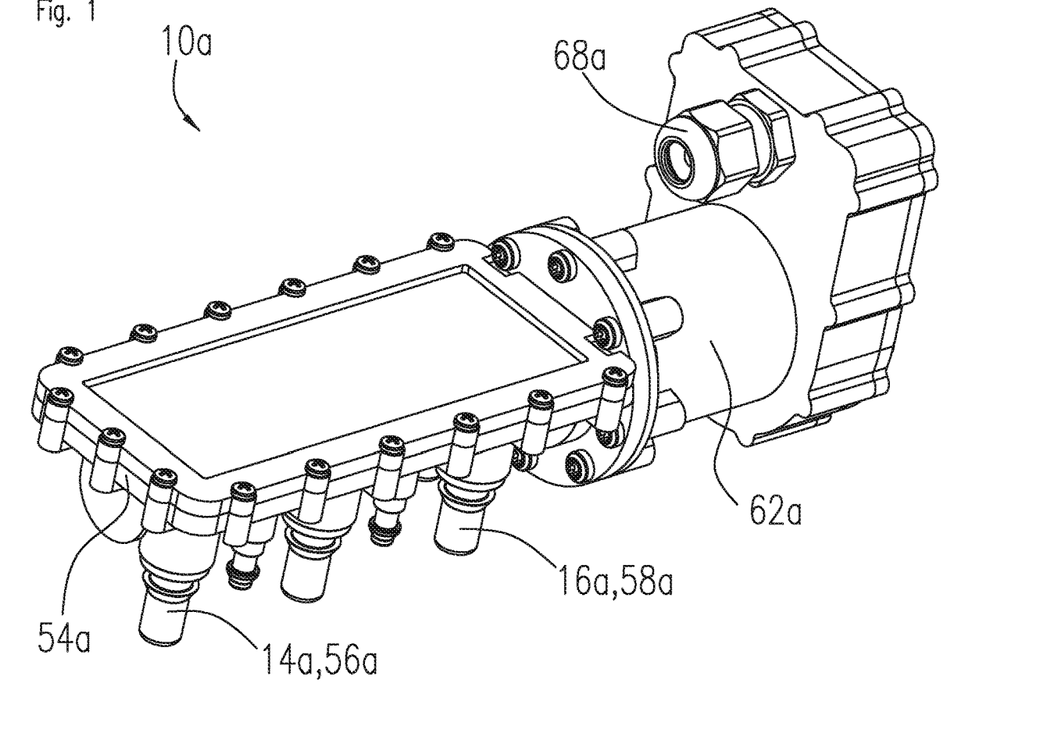
FIG. 1 shows a perspective view of a fluid distribution apparatus.
Figure 2:
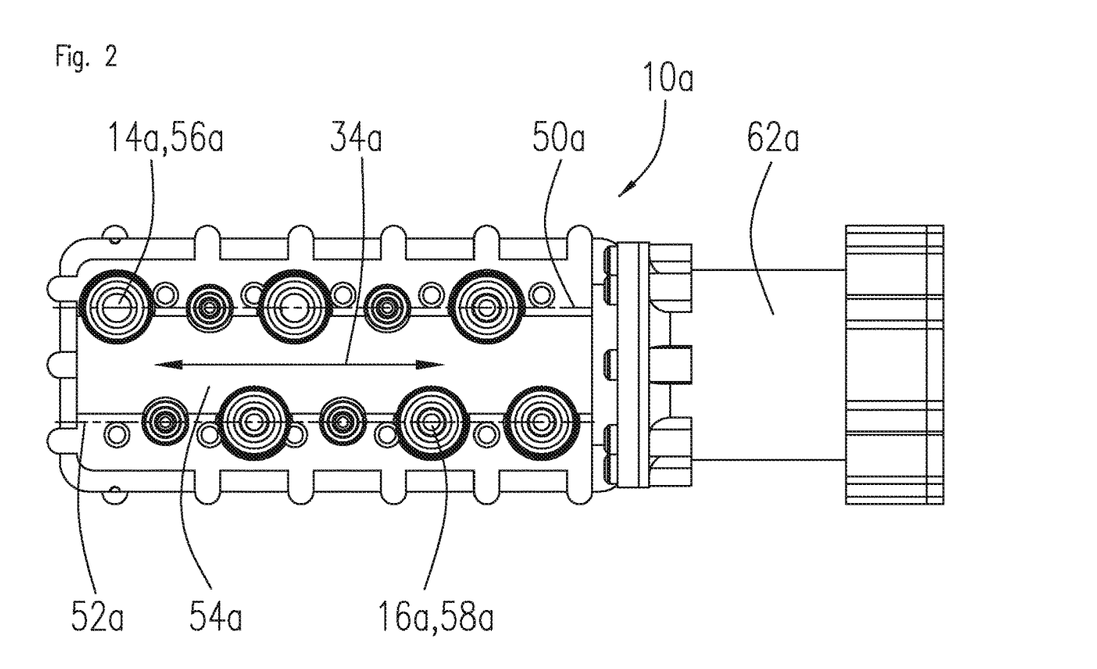
FIG. 2 shows a bottom view of the fluid distribution apparatus.

FIG. 1 is a perspective view of a fluid distribution apparatus 10a. FIG. 2 shows a bottom view of the fluid distribution apparatus 10a. The fluid distribution apparatus 10a is formed, in particular, as a water distribution apparatus. In particular, the fluid distribution apparatus 10a can be provided for use as a wash water distribution apparatus in a wash water distribution system of a motor vehicle. The fluid distribution apparatus 10a comprises a fluid inlet 14a provided for introducing a fluid to be distributed into the fluid distribution apparatus 10a. The fluid inlet 14 is arranged at a bottom side of the housing 54a of the fluid distribution apparatus 10a. The fluid inlet 14a comprises a connection neck 56a protruding from the housing 54a to the outside, which is provided for connecting a fluid line (not shown) connected to a fluid source. Alternatively, the fluid distribution apparatus 10a can comprise a plurality of fluid inlets. Moreover, the fluid distribution apparatus 10a comprises a plurality of fluid outlets 16a provided for discharging a fluid to be distributed from the fluid distribution apparatus 10a. The fluid outlets 16a, just like the fluid inlets 14a, are arranged at the bottom side of the housing 54a of the fluid distribution apparatus 10a. The fluid outlets 16a each have a connection neck 58a protruding from the housing 54a to the outside, which is provided for connection to a fluid line leading to a consumer (not shown). For example, in the examples shown, the fluid distribution apparatus 10a comprises nine fluid outlets 16a, wherein, however, a number of fluid outlets 16a can also deviate from this number.

Figure 3:
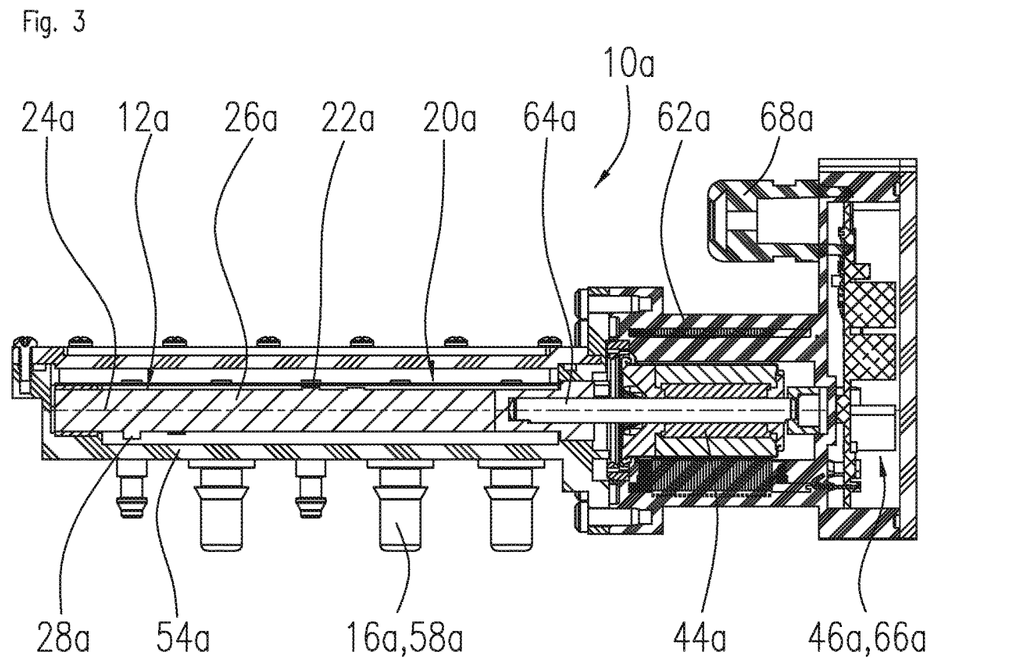
FIG. 3 shows a longitudinal sectional view of the fluid distribution apparatus.

FIG. 3 is a longitudinal sectional view of the fluid distribution apparatus 10a. The fluid distribution apparatus 10a comprises a fluid chamber 12a into which both the fluid inlet 14a and the fluid outlets 16a open out. A sidewall of the fluid chamber 12a is formed by the housing 54a of the fluid distribution apparatus 10a. The fluid chamber 12a is provided for at least partially receiving the fluid to be distributed. The fluid to be distributed is introduced into the fluid chamber 12a by means of the fluid inlet 14a. In particular, the fluid chamber 12a is flowed through by the fluid to be distributed during the operation of the fluid distribution apparatus 10a. Preferably, the fluid chamber 12a is permanently at least essentially fully filled with the fluid to be distributed during operation of the fluid distribution apparatus 10a.

Figure 4:
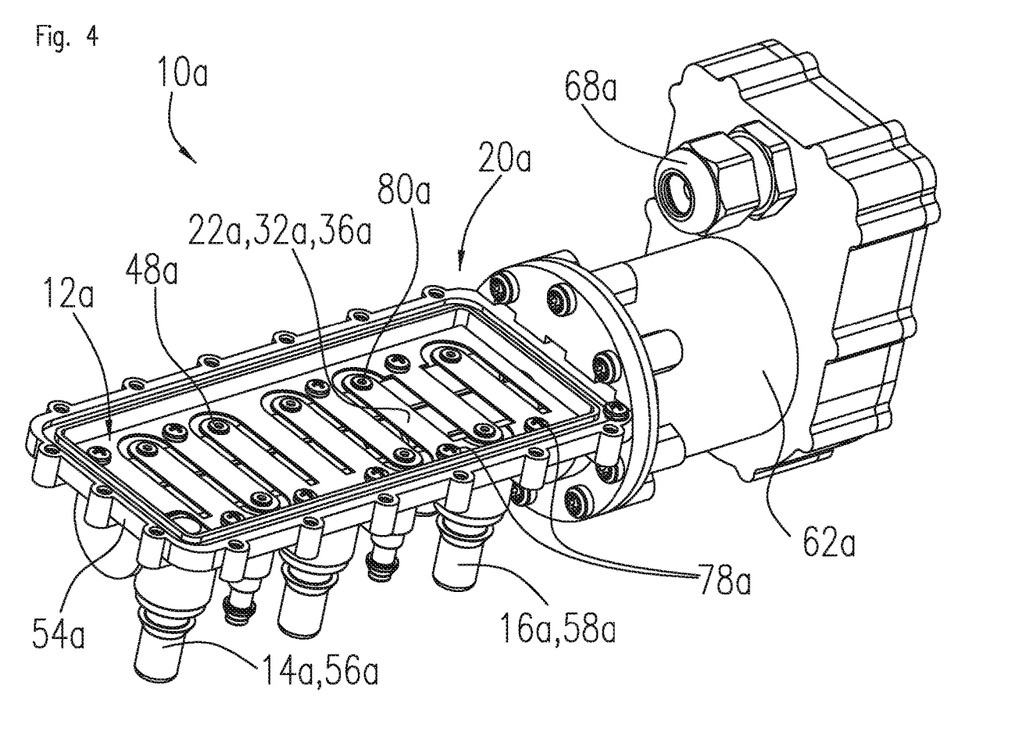
FIG. 4 shows the fluid distribution apparatus with a fluid chamber opened.

Furthermore, the fluid distribution apparatus 10a comprises a distribution unit 20a, which is largely arranged within the fluid chamber 12a. FIG. 4 shows the fluid distribution apparatus 10a with a fluid chamber 12a opened. The distribution unit 20a comprises a plurality of valve elements 22a for closing off the fluid outlets 16a. The valve elements 22a are formed as valve flaps 32a. Each fluid outlet 16a has exactly one of the valve elements 22a associated with it. The distribution unit 20a comprises a plurality of spring elements 36a which are provided for applying a spring force acting in a direction towards the fluid outlets 16a to each of the valve elements 22a. Each valve element 22a has one spring element 36a associated with it. In the example shown, the valve elements 22a are formed of a resilient material, such as spring steel, and thus form the spring elements 36a themselves.

Figure 5:
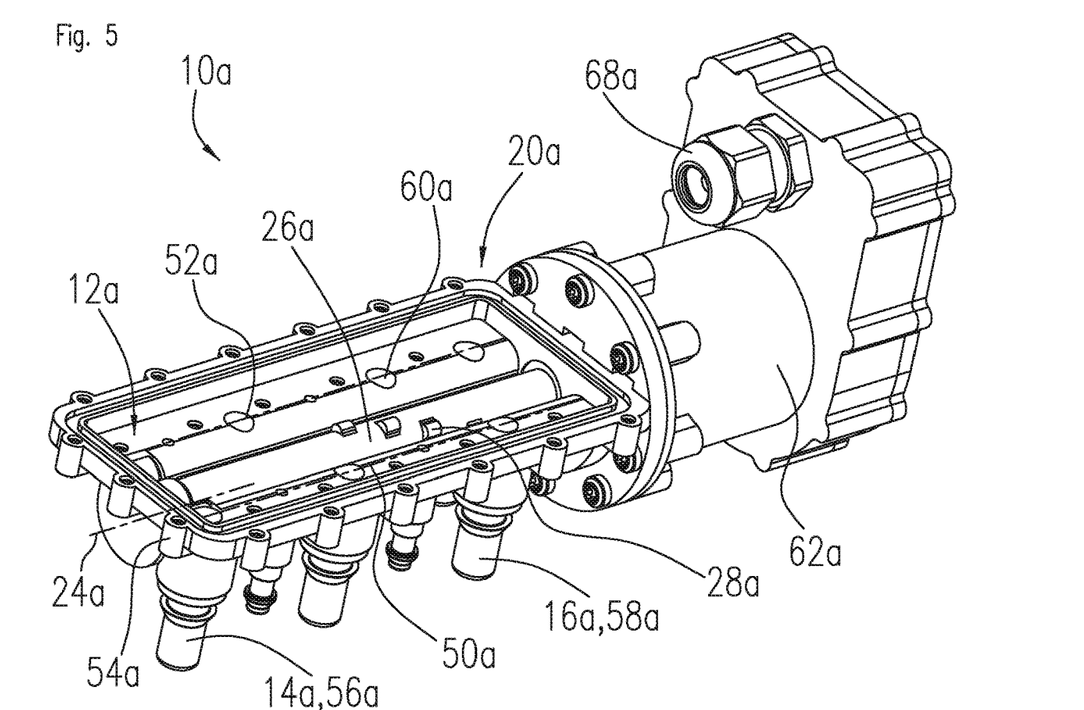
FIG. 5 shows the fluid distribution apparatus with a fluid chamber opened and valve elements removed.

The valve elements 22a have a tongue-shaped configuration. The valve elements 22a are integrally formed and manufactured, for example, by means of stamping or cutting from a sheet metal. The valve elements 22a comprise a fixed end 78a, which is connected to the housing 54a of the fluid distribution apparatus 10a, for example by means of a screw connection, in a positionally fixed relationship. Moreover, the valve elements 22a have a free end 80a opposite the fixed end 78a and positioned at the fluid outlets 16a, which is able to be deflected relative to the fixed end 78a in a direction towards the interior of the fluid chamber 12a. The spring force of the valve elements 22a can be adjusted and/or varied, in particular, by choosing a material thickness or shape of the valve elements 22a. FIG. 5 shows the fluid distribution apparatus 10a with a fluid chamber 12a opened and valve elements 22a removed. The fluid outlets 16a comprise, on the side of the fluid chamber, an essentially circular opening 60a. The valve elements 22a are provided for closing off the fluid outlets 16a by blocking the openings 60a at least essentially in a fluid-tight, in particular water-tight, manner. In an opening area, the fluid outlets 16a are at least essentially flush with an inner sidewall of the fluid chamber 12a.

Moreover, the distribution unit 20a comprises a camshaft 26a supported to be rotatable about a rotary axis 24a, comprising a plurality of cams 28a for operating the valve elements 22a. One end of the camshaft 26a is supported to be rotatable within the fluid chamber 12a. The rotary axis 24a extends at least essentially perpendicular to an outflow direction of the fluid outlets 16a. The camshaft 26a is entirely arranged within the fluid chamber 12a. The cams 28a of the camshaft 26a are provided for lifting the valve elements 22a off the fluid outlets 16a as a function of a rotary position of the camshaft 26a. During a rotary motion of the camshaft 26a the cams 28a of the camshaft 26a act on the valve elements 22a as a function of a rotary position of the camshaft 26a, thus causing lifting off of the valve elements 22a from the fluid outlets 16a and thus opening of the fluid outlets 16a. The cams 28a of the camshaft 26a are provided for lifting off the valve elements 22a against the spring force of the valve elements 36a. For lifting off the valve elements 22a from the fluid outlets 16a, the cams 28a of the camshaft 26a are provided for causing a rocking and/or pivoting motion of the valve elements 22a. The camshaft 26a is arranged beneath the valve elements 22a between the valve elements 22a and the housing 54a, so that the cams 28a of the camshaft 26a elastically deform the valve elements 22a for opening the fluid outlets 16a in a direction towards the interior of the fluid chamber 12a, thus lifting the tongue-shaped valve element 22a off the fluid outlet 16a to be opened.

The cams 28a of the camshaft 26a are arranged on the circumference of the camshaft 26a in such a manner that at each rotary position of the camshaft 26a only one of the valve elements 22a is lifted off any one of the fluid outlets 16a. The fluid outlets 16a are arranged along an axial direction 24a of the camshaft 26a, wherein they are arranged offset with respect to the rotary axis 24a of the camshaft 26a. The fluid outlets 16a are arranged in two rows 50a, 52a, which extend on opposite sides of the camshaft 26a at least essentially parallel to the rotary axis 24a of the camshaft 26a. The fluid outlets 16a of the first rows 50a are arranged along an axial direction 24a of the camshaft 26a offset with respect to the fluid outlets 16a of the second rows 52a. The distribution unit 20a also comprises a plurality of sealing elements 48a arranged on the respective valve elements 22a.

The distribution unit 20a comprises an electric motor 44a which is provided for rotationally driving the camshaft 26a. The electric motor 44a is formed, for example, as a brushless DC motor. The electric motor 44a is arranged within a motor housing 62a which is connected to the fluid chamber 12a. Moreover, the distribution unit 20a comprises at least one control electronics 66a for driving the electric motor 44a. The control electronics 66a is arranged within the motor housing 62a. In addition, the distribution unit 20a comprises a sensor unit 46a which is provided for detecting a rotary position of the camshaft 26a. The sensor unit 46a can comprise, for example, three Hall effect sensors (not shown), which can be integrated in the control electronics 66a. An evaluation electronics integrated, in particular, in the control electronics 66a and/or an evaluation software use the measuring values of the Hall effect sensors to determine the rotary position of the electric motor 44a. To do this, each current rotary position of the electric motor 44a can be stored in a non-volatile memory. A rotary motion of the electric motor 44a is incrementally detected by means of the Hall effect sensors and the new rotary position of the electric motor 44a is determined. The initial rotary position of the electric motor 44a can be stored in the non-volatile memory during installation of the fluid distribution apparatus 10a. Since the camshaft 26a is rotationally fixed with respect to the shaft 64a of the electric motor 44a, the rotary position of the electric motor 44a can also be used to determine the rotary position of the camshaft 26a. A cable passage 68a is arranged on the motor housing 62a, which is provided for routing cables for connection to the control electronics 66a.

Figure 6:
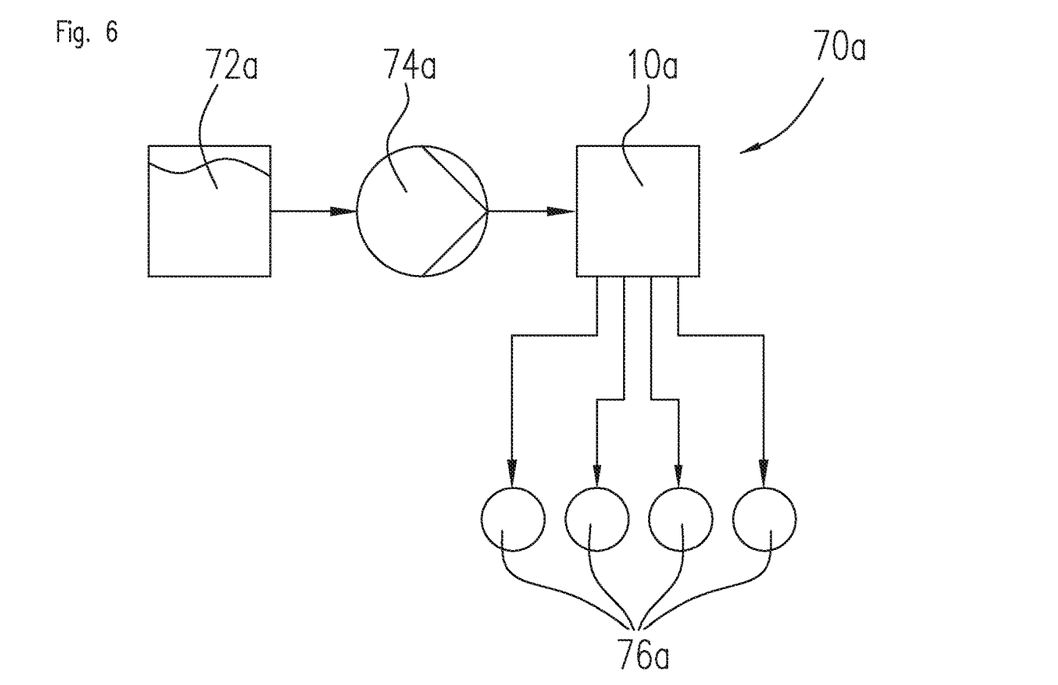
FIG. 6 shows a schematic representation of a fluid distribution system with a fluid distribution apparatus.

FIG. 6 shows a schematic representation of the fluid distribution system 70a, in particular a wash water distribution system for a motor vehicle. The fluid distribution system 70a comprises a fluid distribution apparatus 10a. The fluid distribution system 70a, in addition to the fluid distribution apparatus 10a, comprises a fluid tank 72a for providing the fluid, a fluid pump 74a for pumping the fluid and a plurality of consumers 76a of the fluid. The fluid distribution system 70a, in the present case, for example, comprises four consumers 76a. In the case of a wash water distribution system for a motor vehicle, the fluid tank 70a can be a water tank for receiving a wash water, the fluid pump 74a can be a water pump and the consumers 76a can be, for example, windscreen washer systems and/or headlight washer systems.

Figure 7:
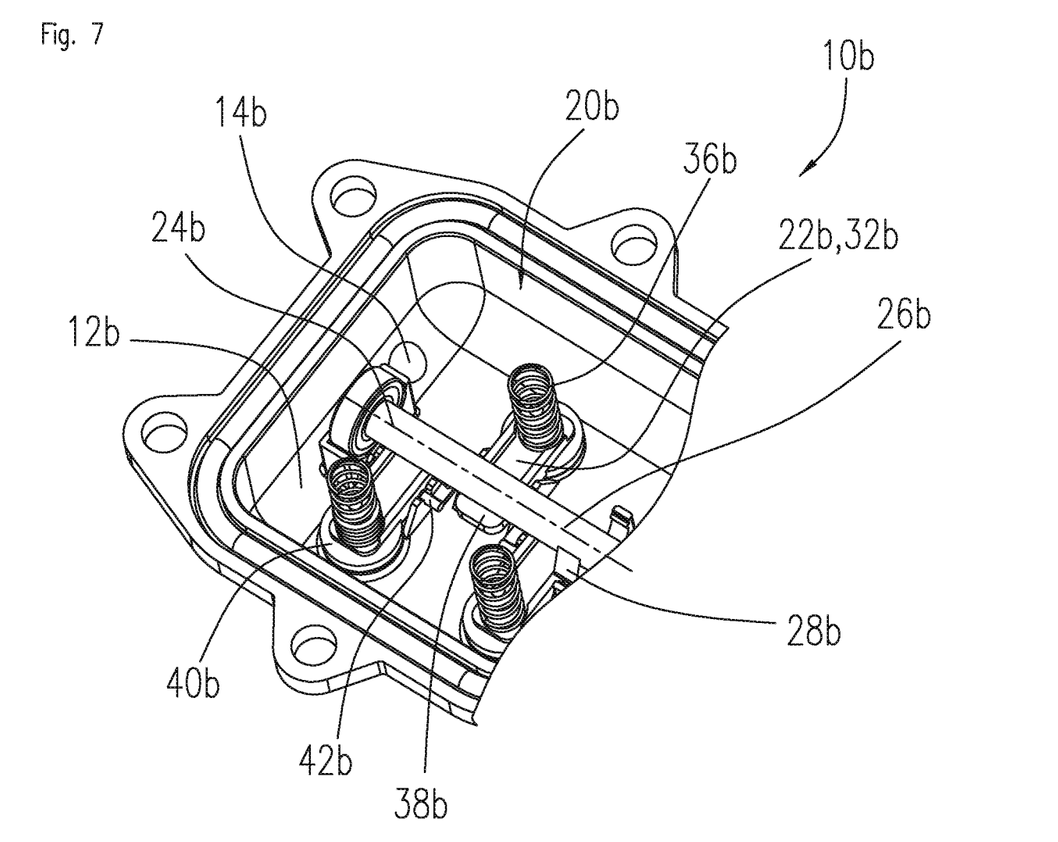
FIG. 7 shows a partial view of the fluid chamber of an alternatively formed fluid distribution apparatus.

FIG. 7 shows a further example. The following descriptions and the drawings are essentially limited to the differences between the examples, wherein, with respect to similarly designated components, in particular, with reference to components having the same reference numerals, basic reference is made to the drawings and/or the description of the other examples, in particular FIGS. 1 to 6. For differentiating the exemplary embodiments, the reference numerals referring to examples shown in FIGS. 1 to 6 have an added letter a. In the examples of FIG. 7, letter a has been replaced by letter b.

FIG. 7 shows a partial view of a fluid chamber 12b, opened, of an alternatively formed fluid distribution apparatus 10b. The fluid distribution apparatus 10b comprises a fluid inlet 14b which is provided for introducing a fluid to be distributed into the fluid distribution apparatus 10b. Moreover, the fluid distribution apparatus 10b comprises a plurality of fluid outlets 16b which are provided for discharging a fluid to be distributed from the fluid distribution apparatus 10b. The fluid outlets 16b, in the embodiment shown in FIG. 7, are covered by valve elements 22b of a distribution unit 20b. The distribution unit 20b comprises a plurality of valve elements 22b for closing the fluid outlets 16b. The valve elements 22b are formed as valve flaps 32b. Each fluid outlet 16b has exactly one of the valve elements 22b associated with it. The distribution unit 20b comprises a plurality of spring elements 36b, which are provided for applying a spring force acting in a direction of the fluid outlets 16b to the respective valve elements 22b. Each of the valve elements 22b has one spring element 36b associated with it. The spring elements 36b are formed as compressive helical springs supported against a cover (not shown) of the fluid chamber 12b.

The valve elements 22b comprise a closure portion 40b provided for closing off the fluid outlets 16b, an operating portion 38b provided for interacting with a cam 28b of the camshaft 26b, and a pivot axis 42b arranged between the closure portion 40b and the operating portion 38b. Departing from the pivot axes 42b, the closure portions 40b of the valve elements 22b face in a direction towards the fluid outlets 16b, while the operating portions 38b of the valve elements 22b face in a direction towards the camshaft 26b. The operating portions 38b of the valve elements 22b are arranged between the camshaft 26b and the housing 54b of the fluid distribution apparatus 10b. When a fluid outlet 16b is opened, a cam 28b of the camshaft 26b pushes the operating portion 38b of the valve element 22b in a direction towards the housing 54b of the fluid distribution apparatus 10b, thus causing the valve element 22b to perform a pivot motion about the pivot axis 42b and the closure portion 40b of the valve element 22b to be lifted off the fluid outlet 16b to be opened against the spring force of one of the spring elements 36b acting on the closure portion 40b.

LIST OF REFERENCE NUMERALS 10 fluid distribution apparatus
12 fluid chamber
14 inlet
16 fluid outlet
20 distribution unit
22 valve element
24 rotary axis
26 camshaft
28 cam
32 valve flap
34 axial direction
36 spring element
38 operating portion
40 closure portion
42 pivot axis
44 electric motor
46 sensor unit
48 sealing element
50 row
52 row
54 housing
56 connection neck
58 connection neck
60 opening
62 motor housing
64 shaft
66 control electronics
68 cable passage
70 fluid distribution system
72 fluid tank
74 fluid pump
76 consumer
78 fixed end
80 free end

What is claimed is:

1. A fluid distribution apparatus comprising a fluid chamber, at least one fluid inlet, a plurality of fluid outlets and a distribution unit, including a plurality of valve elements for closing the fluid outlets and a camshaft supported to be rotatable about a rotary axis, having a plurality of cams for operating the valve elements wherein the valve elements are formed as valve flaps and the cams of the camshaft are provided to lift the valve elements off the fluid outlets as a function of a rotary position of the camshaft and wherein the fluid outlets are arranged in two rows extending on opposite sides of the camshaft at least essentially parallel to the rotary axis of the camshaft.

2. The fluid distribution apparatus of claim 1 positioned in a vehicle.

3. The fluid distribution apparatus according to claim 1, wherein the cams of the camshaft are provided to cause a rocking and/or pivoting motion of the valve elements.

4. The fluid distribution apparatus according to claim 1, wherein each fluid outlet has exactly one of the respective valve elements associated with it.

5. The fluid distribution apparatus according to claim 1, wherein the cams of the camshaft are arranged on the circumference of the camshaft in such a manner that, in each rotary position of the camshaft, a maximum of one of the valve elements is lifted off any of the fluid outlets.

6. The fluid distribution apparatus according to claim 1, wherein the fluid outlets are arranged along an axial direction of the camshaft.

7. The fluid distribution apparatus according to claim 1, wherein the fluid outlets are arranged offset with respect to the rotary axis of the camshaft.

8. The fluid distribution apparatus according to claim 1, wherein the fluid outlets arranged in two rows comprise a first row arranged along an axial direction of the camshaft offset with respect to the fluid outlets of a second row.

9. The fluid distribution apparatus of claim 8 positioned in a vehicle.

10. The fluid distribution apparatus according to claim 1, wherein the distribution unit includes a plurality of spring elements provided to apply a spring force, acting in a direction towards the fluid outlets, to the respective valve elements.

11. The fluid distribution apparatus according to claim 10, wherein each valve element has a respective spring element associated with it.

12. The fluid distribution apparatus according to claim 1, wherein the valve elements are at least partially formed of a resilient material.

13. The fluid distribution apparatus according to claim 1, wherein the valve elements include a closure portion provided for closing the fluid outlets, an operating portion provided for interacting with a cam of the camshaft and a pivot axis arranged between the closure portion and the operating portion.

14. The fluid distribution apparatus according to claim 1, wherein the distribution unit includes an electric motor provided to rotationally drive the camshaft.

15. The fluid distribution apparatus according to claim 1, wherein the distribution unit comprises a sensor unit provided to detect a rotary position of the camshaft.

16. The fluid distribution apparatus according to claim 1, wherein the distribution unit includes a plurality of sealing elements arranged on the respective valve elements and/or on the fluid outlets.

* * * * *